May 22, 1956
O. LANG
2,746,509
EMERGENCY TRACTION CLEAT
Filed March 19, 1954
2 Sheets-Sheet 1
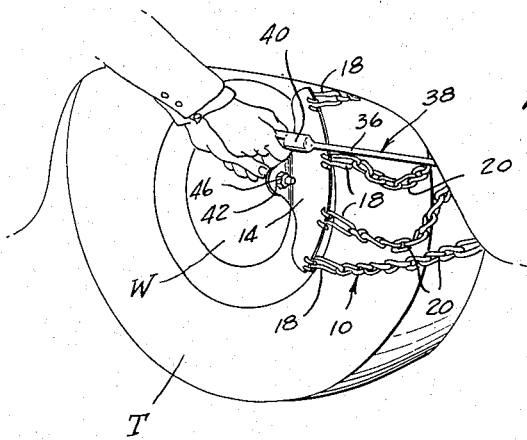
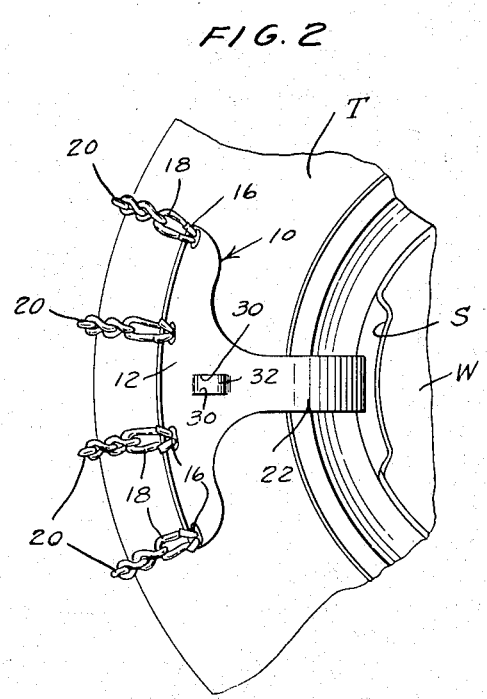
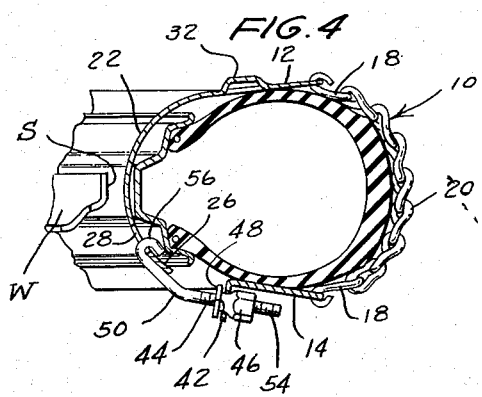
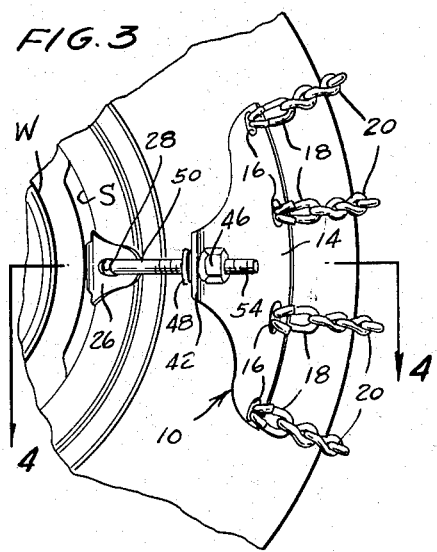
INVENTOR.
OTTO LANG
BY
McMorrow, Berman & Davidson
ATTORNEYS May 22, 1956  O. LANG  2,746,509
EMERGENCY TRACTION CLEAT
Filed March 19, 1954  2 Sheets-Sheet 2
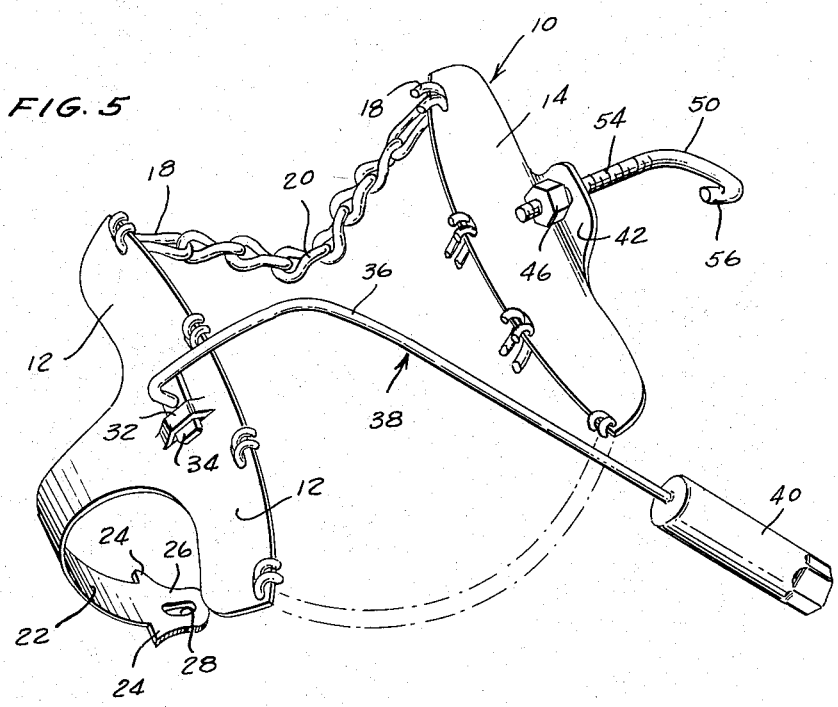
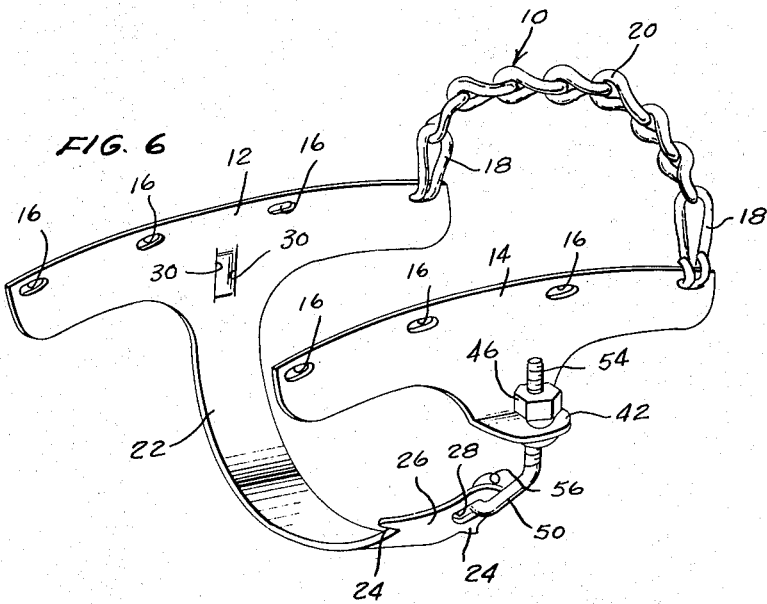
INVENTOR.
OTTO LANG
BY
McMorrow, Berman & Davidson
ATTORNEYS

United States Patent Office 2,746,509
Patented May 22, 1956

2,746,509
EMERGENCY TRACTION CLEAT
Otto Lang, Chicago, Ill.

Application March 19, 1954, Serial No. 417,345

4 Claims. (Cl. 152—237)

This invention relates to an emergency traction cleat and has for its primary object to afford traction to a traction wheel of a vehicle which may have become mired or otherwise ineffective against a surface.

Another object is to facilitate the mounting of the traction cleat on a wheel which may be mired or otherwise ineffective against a surface while at the same time avoiding the necessity of jacking the vehicle or elevating the body of the vehicle relative to the wheel upon which the cleat is to be mounted or from which it is to be dismounted and it is done with the mounting tool shown in drawing (Fig. 1), and it is done standing up without dirtying the user's hands or soiling and damaging his clothes. This annoying condition is further aggravated by the fenders overlapping the wheels to such an extent as to render it extremely difficult, if not impossible, to apply an antiskid device to a wheel without raising the wheel from the ground or elevating the body. The reverse end of the mounting tool acts as a wrench and it will tighten or loosen the nut shown in drawing (Fig. 3).

Still another object is a traction cleat which may be secured in place on the wheel of a vehicle in such a manner that it may remain indefinitely on the wheel, or may at the will of the user be removed from the wheel.

The above and other objects may be attained by employing this invention which embodies among its features inner and outer side plates, flexible traction elements connected to said side plates and extending outwardly from adjacent side edges thereof, said traction elements being adapted to be extended over the tread of a tire carried by a wheel, a curved tongue carried by the inner side plate and extending outwardly from the side edge thereof remote from the traction elements for passage across a tire over the tread thereof and projection through the wheel beneath the tire, means carried by the outer traction plate and extending outwardly therefrom adjacent the side thereof remote from the traction elements for detachable connection to the tongue, and means carried by the inner side plate and projecting outwardly therefrom intermediate the ends thereof for detachably connecting a mounting tool to said cleat.

Other features include a hook carried by the outer side plate and projecting outwardly therefrom adjacent the side thereof remote from the traction elements for entrance into an opening in the tongue and detachably connecting the tongue to the outer side plate, and a loop carried by the inner side plate and projecting outwardly therefrom intermediate the ends thereof for detachably connecting a mounting tool to said cleat.

In the drawings:

Figure 1 is a perspective view of a vehicle showing the cleat being mounted on the tire thereof;

Figure 2 is a fragmentary side elevation showing the inner side of the vehicle wheel with the cleat in place thereon;

Figure 3 is a view similar to Figure 2 from the outside of the wheel showing the cleat in place thereon;

Figure 4 is a transverse sectional view taken substantially on the line 4—4 of Figure 3;

Figure 5 is a perspective view of the cleat showing it mounted on a mounting tool, certain portions of the cross chains of the cleat being omitted; and Figure 6 is a perspective view of the traction cleat showing the tongue coupled to the outer side plate and certain of the cross chains omitted for clarity of illustration.

Referring to the drawings in detail, this improved cleat designated generally 10 comprises an inner side plate 12 and an outer side plate 14. The side plates 12 and 14 are provided with longitudinally spaced openings 16 which extend along adjacent side edges of the side plates 12 and 14 for the reception of the anchoring links 18 of cross chains 20.

Carried by the side plate 12 and extending outwardly from the edge thereof remote from that adjacent the openings 16 is a laterally curved tongue 22 carrying adjacent the end remote from the side plate 12 laterally extending ears 24 which together with the extreme end of the tongue remote from the plate 12 define a head 26 having an opening 28 extending therethrough. Formed in the side plate 12 substantially midway between opposite ends thereof are spaced parallel slits 30 which lie parallel to the tongue 22 and struck outwardly from the plate 12 between the slits is a loop 32 for the reception of a wing 34 carried by the shank 36 of a mounting tool designated generally 38. A handle 40 is carried by the shank 36 of the mounting tool 38 adjacent the end thereof remote from the wing 34, as will be readily understood upon reference to Figure 5.

Extending laterally outwardly from the outer mounting plate 14 is an ear 42 having an opening 44 extending therethrough for the reception of a nut 46 which is swivelly mounted in the ear 42 and retained therein by a retaining flange 48. A hook 50 having an externally screw threaded stem 54 extending from one end thereof is provided at the end remote from the threads 54 with a return bend 56 which is adapted to engage in the opening 28 of the head 26, as will be readily understood upon reference to Figures 3 and 6 of the drawings.

In use, the side plate 12 is connected to the mounting tool 38 and the tongue 22 and side plate 12 are moved across the top of the tire with the cross chains extending across the tread of the tire. The guiding of the side plate 12 by the tool 38 will direct the tongue 22 through a slot S, or between spokes of a vehicle wheel W upon which the tire T is mounted. The tongue is thus disposed beneath the tire, or between the tire and the hub of the wheel with the traction chains extending over the tread of the tire. With the tongue extending through the slot S, as illustrated in Figures 2 and 4, the hook 50 may be engaged with the head 26 of the tongue 22 and upon turning the nut 46 which threadedly engages the threads 54, it will be evident that the cleat 10 will be clamped in place on the tire.

Obviously, when it is so desired, the cleat may be released by loosening the nut 46 on the threaded shank 54 to permit the hook 50 to be disengaged from the head 26 of the tongue 22 so that the tongue may be extracted from the slot S in the wheel W to enable the tongue 22 to be extracted from the slot and the cleat entirely disengaged from the wheel.

This application is a continuation-in-part of my pending application, Serial No. 334,459, filed February 2, 1953, now abandoned.

While in the foregoing there has been shown and described the preferred embodiment of this invention, it is to be understood that minor changes in the details of construction, combination and arrangement of parts may

What is claimed is:

1. In a traction cleat for a wheel having a rim and a tire thereon, an outer plate for engagement with the outer side of the tire, said outer plate having an outward edge and an inward edge, an ear on and projecting from said inward edge and laterally with respect to said outer plate, an inner plate for engagement with the inner side of the tire, said inner plate having an outward edge and an inward edge, flexible traction elements connected to and extending between the outward edges of the outer and inner plates for engagement with the tread of the tire, a nut swivelly mounted on said ear, a hook having a threaded shank threaded in said nut, and a curved tongue fixed at one end on the inward edge of the inner plate for engagement with the rim of the wheel at the side of the rim remote from the tire, said tongue being flat and having a free end portion provided with a slot extending longitudinally of the tongue through which said hook can be passed, said tongue being otherwise imperforate.

2. In a traction cleat for a wheel having a rim and a tire thereon, an outer plate for engagement with the outer side of the tire, said outer plate having an outward edge and an inward edge, an ear on and projecting from said inward edge and laterally with respect to said outer plate, an inner plate for engagement with the inner side of the tire, said inner plate having an outward edge and an inward edge, flexible traction elements connected to and extending between the outward edges of the outer and inner plates for engagement with the tread of the tire, a nut swivelly mounted on said ear, a hook having a treaded shank threaded in said nut, and a curved tongue fixed at one end on the inward edge of the inner plate for engagement with the rim of the wheel at the side of the rim remote from the tire, said tongue having a free end portion provided with a slot extending longitudinally of the tongue through which said hook can be passed, said inner plate having a loop located in the region of said tongue for receiving a mounting tool.

3. In a wheel traction cleat, an inner plate having outward and inward edges, a flat curved tongue on the inward edge of the inner plate, said tongue having a free end portion provided with a slot extending longitudinally of the tongue, said tongue being otherwise imperforate, an outer plate having outward and inward edges, an ear on the inward edge of the outer plate, said ear extending laterally with respect to the outer plate, said ear having an opening, a nut swivelly engaged in said opening, a hook having a shank having one end threaded through said nut and another end, a crook on said other end adapted to pass through the slot, said shank being freely engaged in the slot in the free end portion of the tongue, and flexible traction elements connected to and extending between the outer and inner plates at the outward edges of the plates, said inner plate having a wheel engaging side and said curved tongue reaching away from said wheel engaging side.

4. In a wheel traction cleat, an inner plate having outer and inner edges, a relatively wide tongue on and projecting laterally from said inner edge, said tongue being curved throughout its length and terminating in a free end portion, an outer plate having outer and inner edges, an ear on the inner edge of the outer plate, said ear projecting laterally outwardly from the outer side of the outer plate, flexible traction elements extending between the plates and secured to the outer edges thereof, said ear having a hole therethrough, a nut rotatably and swivelly engaged in said hole, a hook comprising a straight shank having a threaded end passing through said hole in said ear and threaded in said nut, said shank having another end having a laterally projecting crook, said free end portion of the tongue having a longitudinally extending slot long enough to pass said crook therethrough and through which said crook is engaged.

References Cited in the file of this patent

UNITED STATES PATENTS

| | | |
|---|---|---|
| 1,600,485 | Patch | Sept. 21, 1926 |
| 2,222,891 | Ransom | Nov. 26, 1940 |
| 2,238,325 | Hudson | Apr. 15, 1941 |
| 2,239,730 | Moore | Apr. 29, 1941 |
| 2,453,426 | Freed | Nov. 9, 1948 |
| 2,504,032 | Massey | Apr. 11, 1950 |